(12) United States Patent
Gerold et al.

(10) Patent No.: US 9,873,189 B2
(45) Date of Patent: Jan. 23, 2018

(54) METHOD FOR OPERATING A HAND-HELD WORKING DEVICE

(71) Applicant: Hilti Aktiengesellschaft, Schaan (LI)

(72) Inventors: Uwe Gerold, Lindau (DE); Norbert Welte, Klaus (AT); Thorsten Sauer, Göfis (AT)

(73) Assignee: Hilti Aktiengesellschaft, Schaan (LI)

( * ) Notice: Subject to any disclaimer, the term of this patent is extended or adjusted under 35 U.S.C. 154(b) by 234 days.

(21) Appl. No.: 14/440,751

(22) PCT Filed: Dec. 10, 2013

(86) PCT No.: PCT/EP2013/076055
§ 371 (c)(1),
(2) Date: May 5, 2015

(87) PCT Pub. No.: WO2014/090788
PCT Pub. Date: Jun. 19, 2014

(65) Prior Publication Data
US 2015/0251301 A1    Sep. 10, 2015

(30) Foreign Application Priority Data
Dec. 13, 2012 (DE) .................. 10 2012 223 011

(51) Int. Cl.
*G01L 5/00* (2006.01)
*G01L 5/24* (2006.01)
(Continued)

(52) U.S. Cl.
CPC ............. *B25C 1/08* (2013.01); *G01M 99/005* (2013.01); *G01P 15/00* (2013.01)

(58) Field of Classification Search
None
See application file for complete search history.

(56) References Cited

U.S. PATENT DOCUMENTS 6,123,241 A * 9/2000 Walter .................... B25C 1/008
123/46 SC
7,109,675 B2 * 9/2006 Matsunaga ........... H02J 7/0031
173/128

(Continued)

FOREIGN PATENT DOCUMENTS

CN    201175896 Y    1/2009
CN    102036787 A    4/2011
(Continued)

OTHER PUBLICATIONS

International Search Report, PCT/EP2013/076055, dated Apr. 10, 2014.
German Search Report, 10 2012 223 011.4, dated Aug. 7, 2013.

*Primary Examiner* — Peter Macchiarolo
*Assistant Examiner* — Jermaine Jenkins
(74) *Attorney, Agent, or Firm* — Leydig Voit & Mayer

(57) ABSTRACT

The invention relates to a method for operating a hand-held working device (1), which comprises a data acquisition unit (24) in which actuations of the trigger switch and accelerations of the working device (1) are captured. In order to further simplify and/or improve the operation of the hand-held working device, it is monitored within a limited period of time after actuation of the trigger switch whether an acceleration of the working device (1) exceeds an acceleration threshold in order to detect trouble-free ignitions and/or ignition problems during the operation of the working device (1).

20 Claims, 1 Drawing Sheet

(51) Int. Cl.
*G01L 25/00* (2006.01)
*B25C 1/08* (2006.01)
*G01M 99/00* (2011.01)
*G01P 15/00* (2006.01)

(56) References Cited

U.S. PATENT DOCUMENTS

| | | |
|---|---|---|
| 8,397,967 B2 | 3/2013 | Calvet et al. |
| 2003/0015088 A1 | 1/2003 | Wursch et al. |
| 2005/0000998 A1 | 1/2005 | Grazioli et al. |
| 2005/0217875 A1 | 10/2005 | Forster et al. |
| 2006/0065691 A1 | 3/2006 | Shima et al. |
| 2009/0236387 A1 | 9/2009 | Simonelli et al. |
| 2009/0251330 A1 | 10/2009 | Gerold et al. |
| 2011/0067895 A1 | 3/2011 | Nobe et al. |

FOREIGN PATENT DOCUMENTS

| | | | |
|---|---|---|---|
| DE | 44 05 661 A1 | 8/1995 | |
| DE | 10156218 A1 * | 6/2003 | ............ B24B 23/02 |
| DE | 103 03 006 A1 | 8/2004 | |
| DE | 10 2008 000 973 A1 | 10/2009 | |
| EP | 1 277 548 A1 | 1/2003 | |
| JP | H8-276376 A | 10/1996 | |
| JP | 2012-196763 A | 10/2012 | |
| JP | 5083073 B2 | 11/2012 | |
| WO | WO 2005/098886 A2 | 10/2005 | |

\* cited by examiner

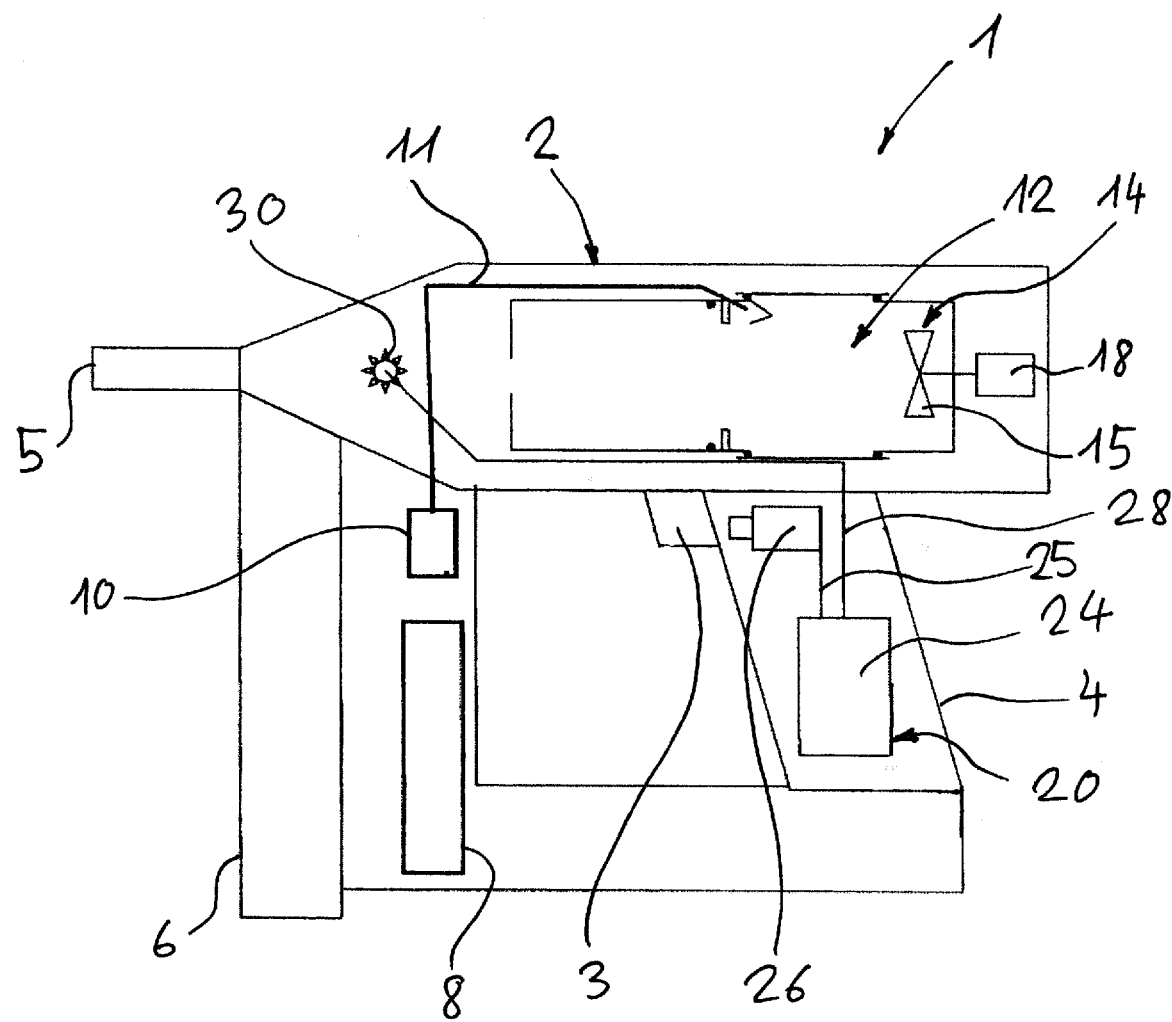

METHOD FOR OPERATING A HAND-HELD WORKING DEVICE

CROSS-REFERENCE TO RELATED APPLICATIONS

This patent application is the U.S. National Stage of International Application No. PCT/EP2013/076055, filed Dec. 10, 2013, which claims the benefit of German Application No. 10 2012 223 011.4, filed Dec. 13, 2012, which are each incorporated by reference.

TECHNICAL FIELD

The invention pertains to a method for operating a hand-held working device that comprises a data-acquisition unit in which trigger switch actuations and accelerations of the working device are detected.

BACKGROUND OF THE INVENTION

German Offenlegungsschrift No. DE 103 03 006 A1 discloses a hand-held working device having a working mechanism arranged therein that generates setting or striking pulses, the working device having at least one sensor device, which is used for capturing acceleration forces appearing during a setting or striking pulse, and a discriminator means that could be coupled to a trigger switch, for example, so that an actual ignition process can be perceived in this manner by the discriminator means. Another hand-held working device, which has sensor means, such as an acceleration sensor, and a controller connected to a trigger switch of the working device, is known from German Offenlegungsschrift No. DE 10 2008 000 973 A1.

BRIEF SUMMARY OF THE INVENTION

The problem addressed by the invention is that of further simplifying and/or improving the operation of a hand-held working device comprising a data-acquisition unit in which trigger switch actuations and accelerations of the working device are detected.

The problem is solved for a method for operating a hand-held working device comprising a data-acquisition unit, in which trigger switch actuations and accelerations of the working device are detected, by monitoring within a limited period of time after actuation of a trigger switch whether an acceleration of the working device exceeds an acceleration threshold, in order to detect fault-free ignitions and/or ignition faults during operation of the working device. The working device is preferably a hand-held working device for setting fasteners that is operated with combustion gas or propellant powder. Therefore the working device can also be referred to as a gas-driven or powder-driven fastener-setting tool or a fastener thrust tool. The combustion gas is fed to a combustion chamber inside the unit, in which the combustible mixture is ignited in order to drive a fastening element such as a bolt or a nail into an underlying surface, preferably indirectly via a setting piston. The operation of the working device can be impaired in an undesired manner by ignition faults. Alternatively, the working device is operated in an arrangement with electrical energy, more particularly from a rechargeable battery arranged inside the working device. In this case, an energy accumulator, such as a spring or a flywheel, which emits the energy stored therein abruptly onto a fastening element, preferably indirectly via a setting piston, is loaded with the aid of a battery-driven electric motor upon actuation of a trigger switch. If such a setting is faulty, then the operation of the working device can also be impaired.

An ignition fault rate or a setting fault rate of the working device during operation can be detected, determined, and monitored or recorded in a simple manner with the method according to the invention. This enables a particularly efficient monitoring of working device performance and user behavior. By monitoring of the ignition fault rate/setting fault rate online, the ignition faults/setting faults can also be eliminated internally in the working device by performing appropriate measures internally in the working device.

A preferred embodiment of the method is characterized by the assumption of a fault-free ignition/setting if the acceleration of the working device exceeds the acceleration threshold. The corresponding values for the acceleration threshold are preferably present or stored in the working device, for example in a suitable control unit.

Another preferred embodiment of the method is characterized by the assumption of an ignition fault/setting fault if the acceleration of the working device fails to reach the acceleration threshold. Inferences of a cause for the ignition fault/setting fault can optionally be drawn from an actually detected acceleration value in relation to the acceleration threshold.

Another preferred embodiment of the method is characterized in that the progression of the acceleration within the limited time duration is detected. Further inferences of the cause for the ignition fault/setting fault can advantageously be drawn from the progression of the acceleration within the limited time duration.

Another preferred embodiment of the method is characterized in that a fault-free ignition/setting is assumed if the acceleration within the limited duration of time has a progression that is characteristic of fault-free operation. The characteristic progression can be determined, for example, by experiments and studies during development of the working device and stored in an internal memory of the working device.

Another preferred embodiment of the method is characterized in that an ignition fault/setting fault is assumed if the acceleration within the limited time duration does not have a progression that is characteristic of a fault-free operation. Depending on the deviation, different measures can be advantageously performed internally in the working device.

Another preferred embodiment of the method is characterized in that the number of fault-free ignitions/setting and/or the number of ignition faults/setting faults is stored. This information can be used, for example, to optimize performance of maintenance work on the working device.

Another preferred embodiment of the method is characterized in that the number of fault-free ignitions/setting and/or the number of ignition faults/setting faults is displayed on the working device. The respective number can be explicitly displayed on the working device. It is also possible, however, to indicate the respective number or one of the respective numbers visually by various colored bars or colored fields, or in the form of diagrams and graphics, externally on the working device. This information can be used, for example, to inform a user of the working device that maintenance work should be performed on the working device.

Another preferred embodiment of the method is characterized in that the number of fault-free ignitions/setting and/or the number of ignition faults/setting faults is displayed and/or read out as necessary or cyclically. The respective number can be displayed when switching the working device on, for example. It is particularly advantageous if the respective number can be read out or displayed in an inspection of the working device or before maintenance work on the working device.

Another preferred embodiment of the method is characterized in that the number of fault-free ignitions/setting and/or the number of ignition faults/setting faults is output via remote data transmission. For this purpose, the working device can advantageously be equipped with a remote data transmission device for wireless, network-supported digital remote data transmission having a radio transmitting and receiving unit and a radio antenna for example, which are connected to an internal control in the device in order to enable position-independent data exchange with a central evaluation point. Such a remote data transmission is described in the above-mentioned German Offenlegungsschrift No. DE 10 2008 000 973 A1, for example.

Other advantages, features, and details of the invention can be deduced from the following description, in which various embodiments are described in detail with reference to the drawing.

BRIEF DESCRIPTION OF THE SEVERAL VIEWS OF THE DRAWING(S)

FIG. 1 shows a schematic representation of a working device according to the invention in cross section.

DETAILED DESCRIPTION OF THE INVENTION

FIG. 1 shows a very simplified view of a fastener-setting working device 1 according to the invention with a housing 2. The working device 1 is designed as a hand-held fastener-setting tool having a handle 4 at which the fastener-setting tool 1 can be held for driving in a fastening element, which exits from the fastener-setting tool 1 at a fastener-guiding end 5 upon actuation of a trigger switch 3 and can be driven into an underlying surface.

The fastening elements used are preferably provided via an internal magazine 6 that is mounted in the vicinity of the fastener-guiding end 5 of the fastener-setting tool 1. The fastening elements are preferably removed automatically from the magazine 6 and provided at the fastener-guiding end 5.

The energy required for driving the fastening elements into the underlying surface is provided in a fuel container 8 in the interior of the fastener-setting working device 1. The fuel container 8 preferably contains liquid combustion gas and is therefore also referred to a gas container or gas cartridge.

The gas cartridge 8 can be connected via an adjustable or controllable metering device 10 and a gas line 11 to a combustion chamber or combustion space 12. The metering device 10 preferably comprises a metering valve, via which the quantity of gas fed to the combustion chamber can be controlled volumetrically or as a function of time for example.

Fuel, preferably fuel from the fuel container 8, is mixed in the combustion space 12 with air to form a combustible mixture that is ignited in order to drive a fastening element such as a bolt or a nail into the underlying surface. The energy required for driving is transmitted from the combustion chamber 12 to a fastening element at the fastener-guiding end 5 via a working piston (not shown) for example.

A device 14, which is used to generate turbulence in the combustion space 12 and to flush and/or cool the combustion space 12, is arranged in the combustion space 12. The device 14 comprises a fan 15 driven by an electric motor 18. The electric motor 18 is triggered by an electronic control device 20.

The control device 20 comprises a data-acquisition unit 24, in which data, such as operating data or measurement values detected in the operation of the working device 1, can be acquired, stored and processed. A sensor device 26 is connected to the control device 20 via a line 25.

The sensor device 26 comprises a probe, for example, by which an actuation of the trigger switch 3 is acquired or detected. When the trigger switch 3 is actuated, this information is relayed via the line 25, preferably constructed as a signal line, to the data-acquisition unit 24 in the control device 20.

An acceleration sensor 30 is connected to the control device 20 via another line 28, which is likewise preferably constructed as a signal line. The acceleration sensor 30 comprises one or more sensors, with which accelerations can be detected during operation of the working device 1, particularly accelerations such as those that occur when setting a fastener.

In particular, the acceleration sensor 30 detects accelerations in the direction of a working device axis along which a fastening element exits from the working device 1 at the fastener-guiding end 5. It is particularly advantageous if the acceleration sensor 30 is designed such that it detects the progression of the respective acceleration. Multiple sensors are preferably combined with one another for this purpose.

The acceleration values detected by the acceleration sensor 30, or the information on the progression of the acceleration, are transmitted via the line 28 to the data-acquisition unit 24 in the control device 20. According to an essential aspect of the invention, an actuating signal, which is detected by the sensor device 26 upon actuation of the trigger switch 3, is used in order to initiate a waiting time in the form of a limited period of time of 150 ms for example, in order to determine an ignition fault rate. The signal when the trigger switch 3, also referred to as a trigger, is actuated is also referred to as a trigger signal.

During the waiting period, the data-acquisition unit 24 waits or monitors whether an acceleration signal detected with the acceleration sensor 30 appears. The control device 20 advantageously monitors or checks, with the aid of the data-acquisition unit 24, whether an acceleration signal that has appeared exceeds an adjustable acceleration threshold.

It is preferably monitored or checked whether an acceleration signal that has appeared has a defined progression, which particularly preferably has two or more acceleration thresholds that are respectively exceeded or not reached at different time points or in defined different time windows.

If such a signal appears within the time window specified by the waiting time, a fault-free ignition can be assumed. A corresponding counter for fault-free ignitions can be incremented in the control device. The information on fault-free ignition can also be stored in some other manner in an internal memory.

If no such signal appears, i.e. if the acceleration signal does not have a defined progression and/or the acceleration threshold is not exceeded, then this can be considered an ignition fault. A corresponding counter for ignition faults can be incremented. The ignition fault can also be stored in some other manner in an internal memory.

The information on ignition faults or fault-free ignitions can be displayed directly to a user or an operator of the working device 1, in order to indicate that a repair or maintenance is due, for example, if the number of ignition faults increases. The information on ignition faults or fault-free ignitions can also be cyclically read out in repair centers. The ignition fault rates can also be collected via remote data transmission and centrally evaluated.

The invention claimed is:

1. A method for operating a fastener-setting working device comprising a trigger switch and a data-acquisition unit which detects trigger switch actuations and accelerations of the working device, the method comprising monitoring and determining, within a limited period of time after actuation of the trigger switch, whether an acceleration of the working device exceeds an acceleration threshold, and, based upon a determination of whether the acceleration of the working device exceeds the acceleration threshold, detecting fault-free ignitions/settings and/or ignition/setting faults during operation of the working device.

2. The method according to claim 1, comprising determining a fault-free ignition/setting if the acceleration exceeds the acceleration threshold.

3. The method according to claim 2, comprising determining an ignition fault/setting fault if the acceleration of the working device fails to reach the acceleration threshold.

4. The method according to claim 2, comprising detecting progression of the acceleration within the limited period of time.

5. The method according to claim 2, wherein a number of fault-free ignitions/settings and/or a number of ignition faults/setting faults are detected, and the number of fault-free ignitions/settings and/or the number of ignition faults/setting faults is stored.

6. The method according to claim 1, comprising determining an ignition fault/setting fault if the acceleration fails to reach the acceleration threshold.

7. The method according to claim 6, comprising detecting progression of the acceleration within the limited period of time.

8. The method according to claim 6, wherein a number of fault-free ignitions/settings and/or a number of ignition faults/setting faults are detected, and the number of fault-free ignitions/settings and/or the number of ignition faults/setting faults is stored.

9. The method according to claim 1, comprising detecting progression of the acceleration within the limited period of time.

10. The method according to claim 9, comprising determining a fault-free ignition/setting if the acceleration within the limited period of time has a progression defined for a fault-free operation.

11. The method according to claim 10, comprising determining an ignition fault/setting fault if the acceleration within the limited period of time does not have a progression defined for a fault-free operation.

12. The method according to claim 10, wherein a number of fault-free ignitions/settings and/or a number of ignition faults/setting faults are detected, and the number of fault-free ignitions/settings and/or the number of ignition faults/setting faults is stored.

13. The method according to claim 11, wherein a number of fault-free ignitions/settings and/or a number of ignition faults/setting faults are detected, and the number of fault-free ignitions/settings and/or the number of ignition faults/setting faults is stored.

14. The method according to claim 9, comprising determining an ignition fault/setting fault if the acceleration within the limited period of time does not have a progression defined for a fault-free operation.

15. The method according to claim 14, wherein a number of fault-free ignitions/settings and/or a number of ignition faults/setting faults are detected, and the number of fault-free ignitions/settings and/or the number of ignition faults/setting faults is stored.

16. The method according to claim 9, wherein a number of fault-free ignitions/settings and/or a number of ignition faults/setting faults are detected, and the number of fault-free ignitions/settings and/or the number of ignition faults/setting faults is stored.

17. The method according to claim 1, wherein a number of fault-free ignitions/settings and/or a number of ignition faults/setting faults are detected, and the number of fault-free ignitions/settings and/or the number of ignition faults/setting faults is stored.

18. The method according to claim 1, wherein a number of fault-free ignitions/settings and/or a number of ignition faults/setting faults are detected, and the number of fault-free ignitions/settings and/or the number of ignition faults/setting faults is displayed on the working device.

19. The method according to claim 1, wherein a number of fault-free ignitions/settings and/or a number of ignition faults/setting faults are detected, and the number of fault-free ignitions/settings and or the number of ignition faults/setting faults is displayed and/or read out.

20. The method according to claim 1, wherein a number of fault-free ignitions/settings and/or a number of ignition faults/setting faults are detected, and the number of fault-free ignitions/settings and/or the number of ignition faults/setting faults is output via remote data transmission.

* * * * *